United States Patent
Xian

(10) Patent No.: US 9,599,881 B2
(45) Date of Patent: Mar. 21, 2017

(54) FRONT-END LIGHTING SYSTEM FOR PROJECTION AND PROJECTION DEVICE

(71) Applicant: Sichuan Dowlab Electronics Technology CO., LTD, Sichuan (CN)

(72) Inventor: Shanhong Xian, Sichuan (CN)

(73) Assignee: SICHUAN DOWLAB ELECTRONICS TECHNOLOGY CO., LTD, Sichuan (CN)

( * ) Notice: Subject to any disclaimer, the term of this patent is extended or adjusted under 35 U.S.C. 154(b) by 0 days.

(21) Appl. No.: 14/978,468

(22) Filed: Dec. 22, 2015

(65) Prior Publication Data
US 2017/0052436 A1    Feb. 23, 2017

(30) Foreign Application Priority Data
Aug. 18, 2015    (CN) .......................... 2015 1 0509111

(51) Int. Cl.
| | | |
|---|---|---|
| *G03B 21/14* | (2006.01) | |
| *G03B 21/20* | (2006.01) | |
| *G02B 27/10* | (2006.01) | |
| *G02B 3/00* | (2006.01) | |
| *G03B 21/00* | (2006.01) | |
| *F21S 10/00* | (2006.01) | |

(52) U.S. Cl.
CPC ........ *G03B 21/2013* (2013.01); *F21S 10/005* (2013.01); *G02B 3/0056* (2013.01); *G02B 3/0068* (2013.01); *G02B 27/102* (2013.01); *G03B 21/008* (2013.01); *G03B 21/2033* (2013.01); *G03B 21/2066* (2013.01)

(58) Field of Classification Search
CPC .............. F21S 10/005; F21Y 2113/005; F21Y 2113/10; F21Y 2113/17; F21Y 2113/002; F21L 14/023; G03B 21/20066; G03B 21/2033; G02B 3/0068; G02B 27/102; G02B 21/008; G02B 3/0056
USPC .......... 362/551, 555, 560, 231, 235, 249.02; 353/31, 34, 37, 38
See application file for complete search history.

(56) References Cited

U.S. PATENT DOCUMENTS

| | | | | |
|---|---|---|---|---|
| 6,547,400 B1 * | 4/2003 | Yokoyama | ........... | G03B 21/208 345/39 |
| 7,131,735 B2 * | 11/2006 | Yokoyama | ........... | G03B 21/208 345/39 |
| 9,482,937 B2 * | 11/2016 | Cheng | .................. | G03B 21/204 |

* cited by examiner

*Primary Examiner* — William C Dowling
(74) *Attorney, Agent, or Firm* — Carter, DeLuca, Farrell & Schmidt, LLP

(57) ABSTRACT

A front-end lighting system for projection includes: a RGB three-color LED light source, configured to generate three monochromatic lights; a reflector, configured to perform a first light mixing operation on three monochromatic lights generated by the RGB three-color LED light source; a first group of relay lenses, configured to adjust a light path; and a compound eye field lens, configured to perform a second light mixing operation on the three monochromatic lights generated by the RGB three-color LED light source. The reflector includes a reflecting surface, and three monochromatic lights emitted by the RGB three-color LED light sources, after being reflected by the reflecting surface of the reflector, pass through the first group of relay lenses and the compound eye field lens in sequence.

10 Claims, 3 Drawing Sheets

FRONT-END LIGHTING SYSTEM FOR PROJECTION AND PROJECTION DEVICE

TECHNICAL FIELD

The invention relates to the field of optical projection, and particularly to a front-end lighting system for projection and a projection device.

BACKGROUND ART

In existing optical projection devices, white light sources or RGB monochromatic light sources are generally adopted as projection light sources. In a case that a RGB monochromatic light source is adopted, there is a need to perform a light mixing operation on three monochromatic lights, i.e., red light, green light and blue light. However, currently, the red light, the green light and the blue light are generally mixed by wavelength combiner(s) for the existing projection device. The application of wavelength combiner(s) normally results in extremely high cost, extremely high assembly requirements, strict assembly tolerance requirements, and low yield, thereby failing to realize mass production. Thus, to provide a front-end system with excellent quality and moderate price for projection device is an urgent problem need to be solved by technicians in this filed.

SUMMARY OF INVENTION

One technical problem to be solved by the invention is to provide a system allowing the projection device to have excellent quality and moderate price, so as to overcome the technical problems resulted from the wavelength combiner(s) adopted in the existing front-end system for the projection device, which having a high cost, high assembly requirements, a strict requirement for assembly tolerance and a low yield.

Accordingly, another technical problem to be solved by the invention is to provide a projection device with excellent quality and moderate price.

For providing a system enabling the projection device to have excellent quality and moderate price, the invention provides a front-end lighting system for projection, which includes: a RGB three-color LED light sources, configured to generate three monochromatic lights; a reflector, configured to perform a first light mixing operation on the three monochromatic lights generated by the RGB three-color LED light source; a first group of relay lenses, configured to adjust a light path; and a compound eye field lens, configured to perform a second light mixing operation on the three monochromatic lights generated by the RGB three-color LED light source. The reflector includes a reflecting surface, and the three monochromatic lights emitted by the RGB three-color LED light sources, after being reflected by the reflecting surface of the reflector, pass through the first group of relay lenses and the compound eye field lens in sequence.

Further, in the above front-end lighting system for projection, the reflector is a hollow quadrangular, and includes a rectangular incoming hole located at the top of the hollow quadrangular, a rectangular outgoing hole located at the bottom of the hollow quadrangular, and a reflecting surface connected between the rectangular incoming hole and the rectangular outgoing hole, with the reflecting surface formed by four trapezoid faces. The three monochromatic lights emitted by the RGB three-color LED light source, after being incident onto the reflecting surface through the rectangular incoming hole, pass through the rectangular outgoing hole of the reflector, the first group of relay lenses and the compound eye field lens in sequence. The hollow quadrangular is formed by bonding together four trapezoid faces each having high light reflection property. The hollow quadrangular has a simple structure and moderate price, and is facilitated to be produced with a simple bonding process.

Further, in the above front-end lighting system for projection, the RGB three-color LED light source is arranged on a central axis of the reflector, a distance from a light-emitting surface of the RGB three-color LED light source to the rectangular incoming hole of the reflector is shorter than 0.6 mm, and in a case that the top of the hollow quadrangular extends outward to form a hollow quadrangular pyramid, the RGB three-color LED light source is housed within a hollow pyramid region of the hollow quadrangular pyramid. Geometry of the RGB three-color LED light source and the distance between it and the rectangular incoming hole of the reflector are set as described above, so that monochromatic lights emitted by the RGB three-color LED light source can enter more into the reflector, to improve the light intensity of the front-end lighting system for projection after uniform scattering.

Further, in the above front-end lighting system for projection, the RGB three-color LED light source includes the same number of red LEDs, green LEDs and blue LEDs, with all of the LED being monochromic. The lights of three colors may be driven with different powers, to change the color temperature of the whole mixed lights. By arranging the light sources in this way, the projected image may have a clear picture and bright colors.

Further, in the above front-end lighting system for projection, an axial length of the reflector is not longer than 12 mm, and a reflective layer is arranged on the reflecting surface of the reflector. With the reflective layer arranged on the reflecting surface of the reflector, on one hand, the reflection effect may be improved; and on the other hand, the material of the reflector may be replaced by plastic as long as a reflective layer is coated on the reflecting surface, lowering down the cost of the whole system.

Further, in the above front-end lighting system for projection, lights emitted from the rectangular outgoing hole of the hollow quadrangular form a uniform image surface after passing through the first group of relay lenses.

Further, in the above front-end lighting system for projection, the compound eye field lens is arranged at a position of the uniform image surface which the lights emitted from the rectangular outgoing hole of the hollow quadrangular form after passing through the first group of relay lenses.

Further, in the above front-end lighting system for projection, the compound eye field lens includes an incident surface and an emergent surface each having a plurality of rectangular spherical array units regularly distributed thereon, wherein the plurality of rectangular spherical array units regularly distributed on the incident surface and the plurality of rectangular spherical array units regularly distributed on the emergent surface are symmetrical to each other with respect to a central section between the incident surface and the emergent surface, and a length direction of the plurality of rectangular spherical array units is consistent with a direction in which the row or column in the distributed array of the RGB three-color LED light source, which has a longer length, is located. By arranging the length direction of the plurality of rectangular spherical array units consistent with the direction in which the row or column in the distributed array of the RGB three-color LED light sources, which has a longer length, is located, the lights after being mixed by the compound eye field lens may have better light uniformity, thereby achieving a better light mixing effect.

For enabling the projection device to have excellent quality and moderate price, the invention provides a projection device, which includes: a RGB three-color LED light source, configured to generate three monochromatic lights; a reflector, configured to perform a first light mixing operation on the three monochromatic lights generated by the RGB three-color LED light sources; a first group of relay lenses, configured to adjust a light path; a compound eye field lens, configured to perform a second light mixing operation on the three monochromatic lights generated by the RGB three-color LED light source; a second group of relay lenses, a reflecting mirror, a prism system, a Digital Micromirror Device (DMD) image generator and a group of projection objective lenses. The reflector includes a reflecting surface, and the three monochromatic lights emitted by the RGB three-color LED light source, after being reflected by the reflecting surface of the reflector, pass through the first group of relay lenses, the compound eye field lens, the second group of relay lenses, the reflecting mirror, the prism system, the DMD image generator and the group of projection objective lenses in sequence. By providing in the projection device the reflecting surface plus the compound eye field lens as a structure of two light mixings, the three monochromatic lights may be mixed more uniformly. At the same time, the structure is simple. Therefore, the optical element of the beam combiner is omitted and the high standard assembly requirements of the beam combiner are absolved, facilitating mass production of this projection device.

Further, in the above projection device, the reflector is a hollow quadrangular, and includes a rectangular incoming hole located at the top of the hollow quadrangular, a rectangular outgoing hole located at the bottom of the hollow quadrangular, and a reflecting surface connected between the rectangular incoming hole and the rectangular outgoing hole, with the reflecting surface formed by four trapezoid faces, wherein the size of the rectangular incoming hole of the hollow quadrangular is larger than the size of a total light-emitting surface of the LEDs, the size of the rectangular outgoing hole is larger than the size of the rectangular incoming hole and is not more than 1.6 times of the size of an effective reflective surface region of the DMD image generator, and the size of the rectangular incoming hole is smaller than the size of the effective reflective surface region of the DMD image generator.

Compared with the conventional art, the invention provides a front-end lighting system for projection, which includes: RGB three-color LED light source, configured to generate three monochromatic lights; a reflector, configured to perform a first light mixing operation on the three monochromatic lights generated by the RGB three-color LED light source; a first group of relay lenses, configured to adjust a light path; and a compound eye field lens, configured to perform a second light mixing operation on the three monochromatic lights generated by the RGB three-color LED light source. The reflector includes a reflecting surface, and the three monochromatic lights emitted by the RGB three-color LED light source, after being reflected by the reflecting surface of the reflector, pass through the first group of relay lenses and the compound eye field lens in sequence. In the provided front-end lighting system for projection, the reflecting surface of the reflector is used to perform the first light mixing operation on the three monochromatic lights emitted by the RGB three-color LED light source, and the compound eye field lens is used to perform the second light mixing operation on the three monochromatic lights emitted by the RGB three-color LED light source. By adopting the structure of two light mixings involving the reflecting surface and the compound eye field lens, the three monochromatic lights may be mixed more uniformly, and the beam combiner may be substituted, thereby avoiding the high standard assembly requirements in assembling the beam combiner, which is beneficial to mass production of the product, solving the technical problems in the prior art that the projection device has high assembly requirements, high cost and non-facilitation of production when using a beam combiner to perform the light mixing operation.

BRIEF DESCRIPTION OF DRAWINGS

For more clearly illustrating embodiments of the invention or technical solutions in the conventional art, accompany drawings, which are referred to when describing the embodiments or the conventional art, will be simply introduced hereinafter. Apparently, the accompany drawings in the following description are only for some embodiments of the invention, and other accompany drawings may be obtained by those skilled in the art based on these accompany drawings without paying any creative work.

Figure 1:
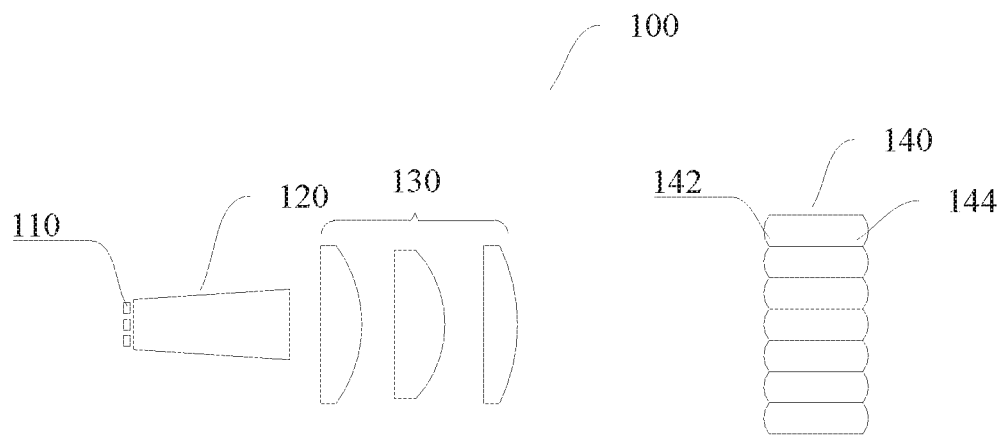
FIG. 1 is a schematic structural diagram of a front-end lighting system for projection provided by a first embodiment of the invention.

Reference numbers are summarized as follows:

front-end lighting system for projection 100, RGB LED light source 110, reflector 120, rectangular incoming hole 122, rectangular outgoing hole 123, reflecting surface 126, first group of relay lenses 130, compound eye field lens 140, incident surface 142, emergent surface 144, second group of relay lenses 150, reflecting mirror 160, prism system 170, DMD image generator 180, the group of projection objective lenses 190, and projection device 200.

DETAILED DESCRIPTION OF EMBODIMENTS

In the following, the invention will be further described in detail by means of embodiments in conjunction with the accompany drawings.

Figure 2:
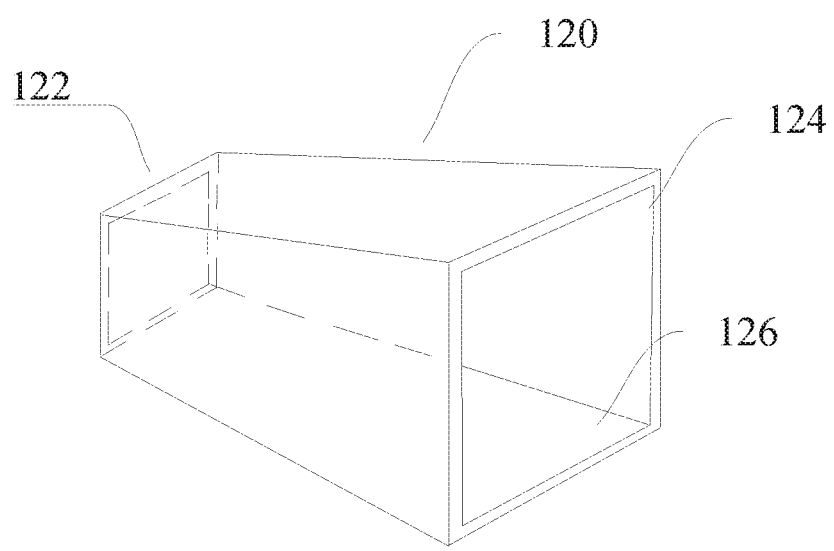
FIG. 2 is a schematic structural diagram of a reflector in the front-end lighting system for projection provided by the first embodiment of the invention.

Referring to FIGS. 1 and 2, a front-end lighting system for projection 100 provided by the first embodiment of the invention includes: a RGB LED light source 110, configured to generate three monochromatic lights; a reflector 120, configured to perform a first light mixing operation on the three monochromatic lights generated by the RGB three-color LED light source 110; a first group of relay lenses 130, configured to adjust a light path; and a compound eye field lens 140, configured to perform a second light mixing operation on the three monochromatic lights generated by the RGB three-color LED light source 110. The reflector 120 includes a reflecting surface 126, and the three monochromatic lights emitted by the RGB three-color LED light source 110, after being reflected by the reflecting surface 126 of the reflector, pass through the first group of relay lenses 130 and the compound eye field lens 140 in sequence.

In the present embodiment, the reflecting surface 126 of the reflector takes the place of the beam combiner in the conventional art to perform the light mixing operation on the red light, the green light and the blue light. In the above front-end lighting system for projection 100, the second light mixing operation is performed on lights emitted by the RGB three-color LED light source 100, to ensure the light uniformity after the three monochromatic lights, i.e., the red light, the green light and the blue light, are mixed. Specifically, the red light, the green light and the blue light are subjected to the first light mixing operation through the reflector 120; and the lights of the three colors, after the first light mixing, pass through the first group of relay lenses 130 and then subjected to the second light mixing operation by the compound eye field lens 140. The first group of relay lenses 130 are formed by multiple collimating lenses, and configured to adjust the light path of the three monochromatic lights after the first light mixing operation.

In the above front-end lighting system for projection 100, the reflecting surface 126 of the reflector is used to perform the first light mixing operation on the three monochromatic lights emitted by the RGB three-color LED light sources 110, and the compound eye field lens 140 is used to perform the second light mixing operation on the three monochromatic lights emitted by the RGB three-color LED light source 110. With the structure of two light mixings involving the reflecting surface 126 plus the compound eye field lens 140, the three monochromatic lights may be mixed more uniformly, and the beam combiner may be substituted, thereby avoiding the high standard complex assembly requirements due to the use of the beam combiner, which is beneficial to mass production of the product.

Further, referring to FIG. 2, in the first embodiment of the invention, the reflector 120 in the above front-end lighting system for projection 100 is a hollow quadrangular, and includes a rectangular incoming hole 122 located at the top of the hollow quadrangular, a rectangular outgoing hole 124 located at the bottom of the hollow quadrangular, and a reflecting surface 126 connected between the rectangular incoming hole 122 and the rectangular outgoing hole 124, with the reflecting surface 126 formed by four trapezoid faces. The three monochromatic lights emitted by the RGB three-color LED light source 110, after being incident onto the reflecting surface 126 through the rectangular incoming hole 122, pass through the rectangular outgoing hole 124 of the reflector 120, the first group of relay lenses 130 and the compound eye field lens 140 in sequence.

Referring to FIG. 2, in the present embodiment of the invention, the reflector 120 is a hollow quadrangular, which has the top and the bottom, with the openings at the top and the bottom respectively serving as the rectangular incoming hole 122 and the rectangular outgoing hole 124 of the hollow quadrangular. Inner side surface of the hollow quadrangular forms the reflecting surface 126 of the reflector, and specifically, the inner side surface of the hollow quadrangular is formed by the trapezoid faces, the upper base and the lower base of which are the side of the rectangular incoming hole 122 and the side of the rectangular outgoing hole 124. In practical production, the four side edges of the hollow quadrangular may be formed by bonding together four trapezoid faces each having high light reflection property.

By adopting the above hollow quadrangular as the reflector 120, on one hand, the good reflection effect can make the red light, the green light and the blue light well mixed; and on the other hand, the above hollow quadrangular is simple in structure, facilitating to be produced.

Figure 3:
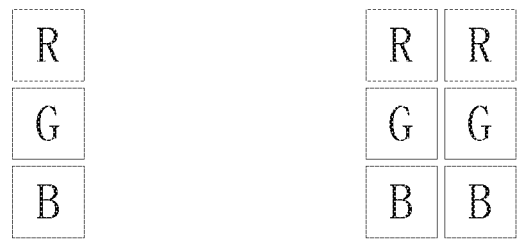
FIG. 3 is a diagram showing arrangement of the RGB LED light source in the front-end lighting system for projection provided by the first embodiment of the invention.

Further, referring to FIG. 3, in the first embodiment of the invention, the RGB three-color LED light source 110 in the above front-end lighting system for projection 100 includes the same number of red LEDs, green LEDs and blue LEDs with the LED are monochromic.

Referring to FIG. 3, in the present embodiment of the invention, there are preferably one red monochromic LED, one green monochromic LED and one blue monochromic LED. Specifically, the red LED, the green LED and the blue LED are arranged in such a manner that the green LED is located in the middle, and the red LED and the blue LED are located on the two sides of the green LED respectively. Meanwhile, the color temperature of the three monochromatic lights after being mixed may be changed by controlling the power of each of the red monochromic LED, the green monochromic LED and the blue monochromic LED.

By adopting the above arrangement of the RGB three-color LED light source and the power control, the projected image may have a clear picture and bright colors.

Further, in the first embodiment of the invention, an axial length of the reflector 120 in the above front-end lighting system for projection 100 is not longer than 12 mm, and a reflective layer is provided on the reflecting surface 126 of the reflector.

With the reflective layer provided on the reflecting surface 126 of the reflector, on one hand, the reflection effect may be improved; and on the other hand, the material of the reflector 120 may be replaced by plastic, as long as a reflective layer is coated on the reflecting surface 126, lowering the manufacturing cost of the whole system.

Further, in the first embodiment of the invention, lights emitted from the rectangular outgoing hole 124 of the hollow quadrangular form a uniform image surface after passing through the first group of relay lenses 130, in the above front-end lighting system for projection 100.

Figure 4:
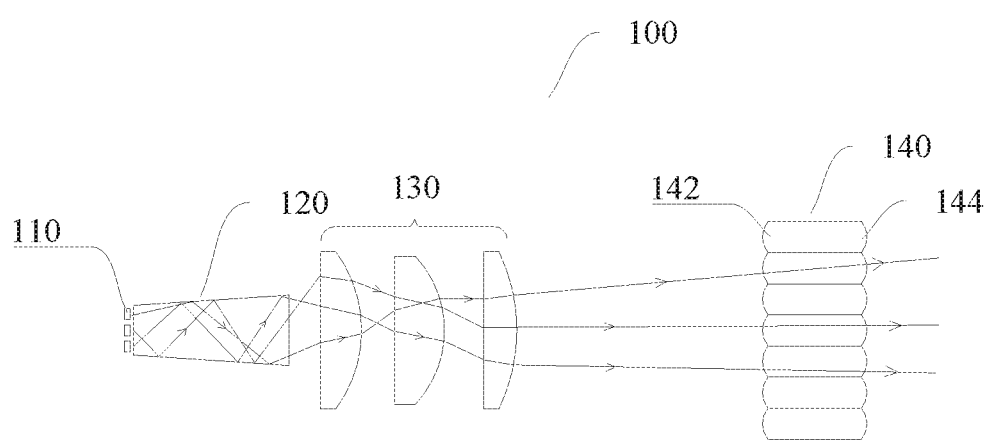
FIG. 4 is a schematic light path diagram of the front-end lighting system for projection provided by the first embodiment of the invention.

Referring to FIG. 4, in the embodiment, the first group of relay lenses 130 is formed of three lenses. The first group of relay lenses 130 is configured to make the three monochromatic lights not scattered during transmitting along a light path, so as to confine the light within a certain width of the light path, thereby it is achieved that the three monochromatic lights form the uniform image surface after passing through the first group of relay lenses 130. In other embodiments of the invention, the number of lenses in the group of relay lenses 130 may be set as required.

Further, in the first embodiment of the invention, the compound eye field lens 140 in the above front-end lighting system for projection 100 is arranged at a position of the uniform image surface which the lights emitted from the rectangular outgoing hole 124 of the hollow quadrangular form after passing through the first group of relay lenses 130.

In the present embodiment, the compound eye field lens 140 is arranged in the light path after the first group of relay lenses 130, and the uniform image surface formed by the three monochromatic lights after passing through the first group of relay lenses 130 is projected onto the compound eye field lens 140, to be subjected to the second light mixing operation.

Further, in the first embodiment of the invention, the compound eye field lens 140 in the above front-end lighting system for projection 100 includes an incident surface 142 and an emergent surface 144 each having a plurality of rectangular spherical array units regularly distributed thereon, the plurality of rectangular spherical array units regularly distributed on the incident surface 142 and the plurality of rectangular spherical array units regularly distributed on the emergent surface 144 are symmetrical to each other with respect to a central section between the incident surface 142 and the emergent surface 144, and a length direction of the plurality of rectangular spherical array units is consistent with a direction in which the row or column of a distributed array of the RGB three-color LED light source 110, which has a longer length, is located.

In the present embodiment of the invention, the compound eye field lens 140 may include the incident surface 142 and the emergent surface 144 each having a plurality of rectangular spherical array units regularly distributed thereon. The second light mixing operation is performed on the three monochromatic lights by the plurality of rectangular spherical array units on the incident surface 142 and the emergent surface 144. The plurality of rectangular spherical array units on the incident surface 142 and the plurality of rectangular spherical array units on the emergent surface 144 are symmetrical to each other with respect to a central section between the incident surface 142 and the emergent surface 144, wherein a distance between the central section and the incident surface 142 of the compound eye field lens is equal to a distance between the central section and the emergent surface 144 of the compound eye field lens. Herein, the length direction of the plurality of rectangular spherical array units is provided consistent with a direction of the row or column of a distributed array of the RGB three-color LED light source 110 in the front-end lighting system for projection 100 which has a longer length.

By arranging the length direction of the plurality of rectangular spherical array units to be consistent with the direction of the row or column of the distributed array of the RGB three-color LED light sources 100 which has a longer length, the lights after being mixed by the compound eye field lens 140 may have better light uniformity, thereby achieving a better light mixing effect.

Figure 5:
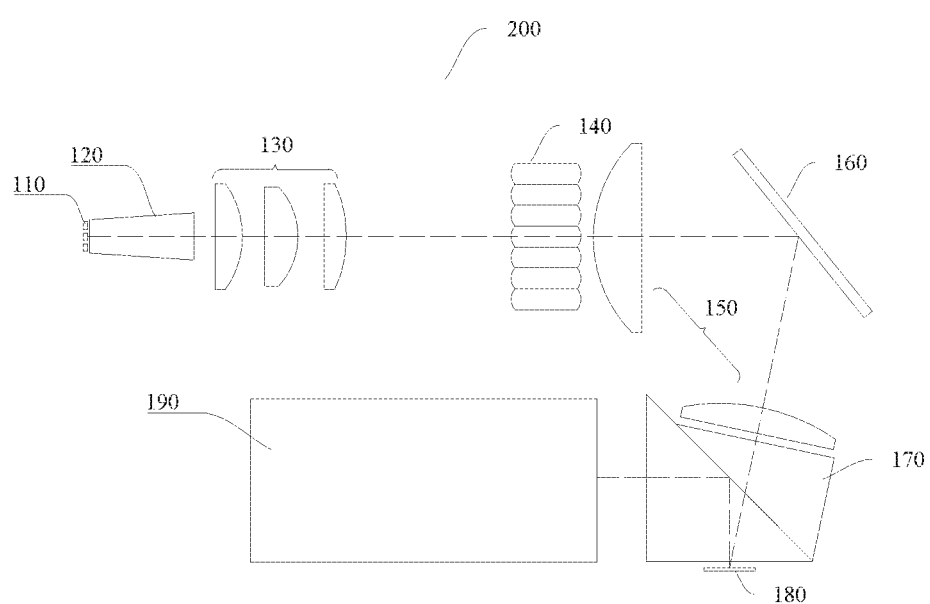
FIG. 5 is schematic structural diagram of a projection device provided by a second embodiment of the invention.

Referring to FIG. 5, the second embodiment of the invention provides a projection device 200, which includes: a RGB LED light source 110, configured to generate three monochromatic lights; a reflector 120, configured to perform a first light mixing operation on the three monochromatic lights generated by the RGB three-color LED light source 110; a first group of relay lenses 130, configured to adjust a light path; a compound eye field lens 140, configured to perform a second light mixing operation on the three monochromatic lights generated by the RGB three-color LED light source 110; a second group of relay lenses 150, a reflecting mirror 160, a prism system 170, a Digital Micromirror Device (DMD) image generator 180 and a group of projection objective lenses 190. The reflector 120 includes a reflecting surface, and the three monochromatic lights emitted by the RGB three-color LED light source 110, after being reflected by the reflecting surface of the reflector 120, pass through the first group of relay lenses 130, the compound eye field lens 140, the second group of relay lenses 150, the reflecting mirror 160, the prism system 170, the DMD image generator 180 and the group of projection objective lenses 190 in sequence.

In the above projection device 200, the reflecting surface of the reflector 120 is used to perform the first light mixing operation on the three monochromatic lights emitted by the RGB three-color LED light source 110, and the compound eye field lens 140 is used to perform the second light mixing operation on the three monochromatic lights emitted by the RGB three-color LED light source 110. With the structure of two light mixings involving the reflecting surface plus the compound eye field lens 140, the three monochromatic lights may be mixed more uniformly, by means of which the existing beam combiner may be substituted, thereby avoiding the high standard complex assembly requirements due to the use of the beam combiner, which is beneficial to mass production of the product.

Further, in the second embodiment of the invention, the reflector 120 in the above projection device 200 is a hollow quadrangular, and includes a rectangular incoming hole 122 located at the top of the hollow quadrangular, a rectangular outgoing hole 124 located at the bottom of the hollow quadrangular, and a reflecting surface connected between the rectangular incoming hole 122 and the rectangular outgoing hole 124, with the reflecting surface formed by four trapezoid faces, wherein the size of the rectangular incoming hole 122 of the hollow quadrangular is larger than the size of a total light-emitting surface of LEDs, the size of the rectangular outgoing hole 124 is larger than the size of the rectangular incoming hole 122 and is not more than 1.6 times of the size of an effective reflective surface region of the DMD image generator 180, and the size of the rectangular incoming hole 122 is smaller than the size of the effective reflective surface region of the DMD image generator 180.

By adopting the above hollow quadrangular as the reflector 120, on one hand, the red light, the green light and the blue light may be mixed better; and on the other hand, the above hollow quadrangular is simple in structure, facilitated in production and easy in processing, due to the good reflecting effect. In addition, by setting the size of the rectangular incoming hole 122, the size of the rectangular outgoing hole 124, the size of the light-emitting surface of the LED lights, and the size of the effective reflective surface region of the DMD image generator 180 as above, the effect of an image projected by the projection device 200 is improved.

In summary, in the front-end lighting system for projection and the projection device provided by the invention, with the two light mixings performed by the reflecting surface and the compound eye field lens, the three monochromatic lights may be mixed more uniformly, and the beam combiner in the conventional art may be substituted, thereby avoiding the high standard complex assembly requirements due to the use of the beam combiner, which is beneficial to mass production of the product.

It should be noted that, the embodiments of the invention are described herein in a progressive manner, with the emphasis of each of the embodiments focusing on the difference between it and other embodiments; hence, for the part of an embodiment same or similar to other embodiments, one can refer to the other embodiments.

The above embodiments are only preferable embodiments of the invention, and should not be interpreted as limiting the invention. For those skilled in the art, various variations and changes may be made to the invention. Any modifications, equivalent substitutions and improvements made within the spirit and principle of the invention should fall into the scope of protection of the invention. It should be noted that, similar reference numbers and alphabets denote similar items in the accompany drawings; therefore, once one item has been defined in one accompany drawing, there is no need to give further definition and explanation to the item in the sequent accompany drawings.

It should be noted that, in the description of the invention, the terms, such as "central", "top", "bottom", "left", "right", "vertical", "horizontal", "inside" or "outside", indicates an orientational or positional relationship which is on the basis of that illustrated in the accompany drawings, or an orientational or positional relationship that the product provided by the invention is generally placed when being used; and it is only used for the purposes of describing the present invention and simplifying the description, rather than indicating or implying that the device or element in question must be in the specific orientation or must operate or be configured at the specific orientation. And it thus should not be interpreted as limiting the invention. In addition, terms, such as "first", "second", "third" and the like, are only used to distinguishing different elements, and should not be considered as indicating or implying the relative relationship is of importance.

It should also be noted that, in the description of the invention, terms, such as "provide", "arrange", "connected with" and "connecting", should be broadly interpreted, unless otherwise specified and defined. For example, they may refer to a fixed connection, a detachable connection, or an integral connection; or they may refer to a mechanical connection or an electrical connection; or they may refer to a direct connection, an indirect connection through an intermediate, or internal communication between two elements. For those skilled in the art, specific meanings of the above terms in the invention should be understood based on specific situations.

The invention claimed is:

1. A front-end lighting system for projection, comprising:
   a RGB three-color LED light source, configured to generate three monochromatic lights;
   a reflector, configured to perform a first light mixing operation on three monochromatic lights generated by the RGB three-color LED light source;
   a first group of relay lenses, configured to adjust a light path; and
   a compound eye field lens, configured to perform a second light mixing operation on the three monochromatic lights generated by the RGB three-color LED light source,
   wherein the reflector comprises a reflecting surface, and the three monochromatic lights emitted by the RGB three-color LED light source, after being reflected by a reflecting surface of the reflector, pass through the first group of relay lenses and the compound eye field lens in sequence.

2. The front-end lighting system for projection according to claim 1, wherein the reflector is a hollow quadrangular, and comprises a rectangular incoming hole located at a top of the hollow quadrangular, a rectangular outgoing hole located at a bottom of the hollow quadrangular, and a reflecting surface connected between the rectangular incoming hole and the rectangular outgoing hole, with the reflecting surface formed by four trapezoid faces, wherein the three monochromatic lights emitted by the RGB three-color LED light source, after being incident onto the reflecting surface through the rectangular incoming hole, pass through the rectangular outgoing hole of the reflector, the first group of relay lenses and the compound eye field lens in sequence.

3. The front-end lighting system for projection according to claim 2, wherein the RGB three-color LED light source is arranged on a central axis of the reflector, a distance from a light-emitting surface of the RGB three-color LED light source to the rectangular incoming hole of the reflector is shorter than 0.6 mm, and in a case that the top of the hollow quadrangular extends outward to form a hollow quadrangular pyramid, the RGB three-color LED light source is housed within a hollow region of the hollow quadrangular pyramid.

4. The front-end lighting system for projection according to claim 1, wherein the RGB three-color LED light source comprises the same number of red monochromic LEDs, green monochromic LEDs and blue monochromic LEDs.

5. The front-end lighting system for projection according to claim 1, wherein an axial length of the reflector is not longer than 12 mm, and a reflective layer is arranged on the reflecting surface of the reflector.

6. The front-end lighting system for projection according to claim 2, wherein lights emitted from the rectangular outgoing hole of the hollow quadrangular form a uniform image surface after passing through the first group of relay lenses.

7. The front-end lighting system for projection according to claim 6, wherein the compound eye field lens is arranged at a position of a uniform image surface which the lights emitted from the rectangular outgoing hole of the hollow quadrangular form after passing through the first group of relay lenses.

8. The front-end lighting system for projection according to claim 1, wherein the compound eye field lens comprises an incident surface and an emergent surface each having a plurality of rectangular spherical array units regularly distributed thereon, the plurality of rectangular spherical array units regularly distributed on the incident surface and the plurality of rectangular spherical array units regularly distributed on the emergent surface are symmetrical to each other with respect to a central section between the incident surface and the emergent surface, and a length direction of the plurality of rectangular spherical array units is consistent with a direction in which the row or column of a distributed array of the RGB three-color LED light source, which has a longer length, is located.

9. A projection device, comprising:
   a RGB three-color LED light source, configured to generate three monochromatic lights;
   a reflector, configured to perform a first light mixing operation on three monochromatic lights generated by the RGB three-color LED light source;
   a first group of relay lenses, configured to adjust a light path;
   a compound eye field lens, configured to perform a second light mixing operation on the three monochromatic lights generated by the RGB three-color LED light source;
   a second group of relay lenses;
   a reflecting mirror;
   a prism system;
   a Digital Micromirror Device (DMD) image generator; and
   a group of projection objective lenses,
   wherein the reflector comprises a reflecting surface, and the three monochromatic lights emitted by the RGB three-color LED light source, after being reflected by the reflecting surface of the reflector, pass through the first group of relay lenses, the compound eye field lens, the second group of relay lenses, the reflecting mirror, the prism system, the DMD image generator and the group of projection objective lenses in sequence.

10. The projection device according to claim 9, wherein the reflector is a hollow quadrangular, and comprises a rectangular incoming hole located at a top of the hollow quadrangular, a rectangular outgoing hole located at a bottom of the hollow quadrangular, and the reflecting surface connected between the rectangular incoming hole and the rectangular outgoing hole, with the reflecting surface formed by four trapezoid faces, wherein size of the rectangular incoming hole of the hollow quadrangular is larger than size of a total light-emitting surface of LEDs, size of the rectangular outgoing hole is larger than size of the rectangular incoming hole and is not more than 1.6 times of size of an effective reflective surface region of the DMD image generator, and the size of the rectangular incoming hole is smaller than the size of the effective reflective surface region of the DMD image generator.

* * * * *